United States Patent [19]

Nothnagel et al.

[11] Patent Number: 4,719,314

[45] Date of Patent: Jan. 12, 1988

[54] CABLE TRANSITION INTO THE HOUSING OF A DEVICE

[75] Inventors: Gerd Nothnagel, Munich; Heiner Thomfohrde, Hohenschaeftlarn, both of Fed. Rep. of Germany

[73] Assignee: Siemens Aktiengesellschaft, Berlin and Munich, Fed. Rep. of Germany

[21] Appl. No.: 845,508

[22] Filed: Mar. 28, 1986

[30] Foreign Application Priority Data

Apr. 4, 1985 [DE] Fed. Rep. of Germany ... 8510161[U]

[51] Int. Cl.[4] .............................................. H05K 5/02
[52] U.S. Cl. ..................................... 174/65 R; 439/11
[58] Field of Search .................... 174/65 R, 135, 136; 339/101, 106, 6 A, 6 R; 285/7; 403/115, 116, 65, 76; 439/1, 445, 453, 11

[56] References Cited

U.S. PATENT DOCUMENTS

| | | | |
|---|---|---|---|
| 2,249,620 | 7/1941 | Samuels | 339/6 A |
| 2,511,772 | 6/1950 | Finizie | 339/6 A |
| 2,512,062 | 6/1950 | Huffman | 339/101 |
| 2,536,996 | 1/1951 | Holland et al. | 339/6 A |
| 2,935,348 | 5/1960 | Jones | 403/116 |
| 3,150,891 | 9/1964 | Kirkeby | 403/71 |
| 4,190,307 | 2/1980 | Eckart | 339/101 |
| 4,357,519 | 11/1982 | Bain, Jr. | 339/101 |
| 4,521,936 | 6/1985 | Medwed | 285/7 |

FOREIGN PATENT DOCUMENTS 1291066  3/1969  Fed. Rep. of Germany .

*Primary Examiner*—A. T. Grimley
*Assistant Examiner*—Kathleen Heimiller
*Attorney, Agent, or Firm*—Hill, Van Santen, Steadman & Simpson

[57] ABSTRACT

At a rear side, a plastic housing of an operating unit for a radio telephone has cable transitions at a housing edge which are movable in a pivotal manner so that flexible cables extending through the cable transitions are protected against fatigue and rupture.

6 Claims, 2 Drawing Figures

4,719,314

CABLE TRANSITION INTO THE HOUSING OF A DEVICE

BACKGROUND OF THE INVENTION

1. Field of the Invention

The present invention relates to a cable transition into the housing of a device of communications technology, particularly of an operating unit for a radio device.

2. Description of the Prior Art

Particularly in the more recent operating units for radio broadcast, there is frequently a need of being able to operate the device in a great variety of attitudes. For this purpose, it is necessary to fabricate the cable, which is usually connected out at the rear, in a correspondingly-flexible fashion, but the same can lead to fatigue and ruptures, particularly given frequent changes in position of the operating unit.

SUMMARY OF THE INVENTION

The object of the present invention, therefore, is to provide a cable transition wherein, in particular, the disadvantage of ruptures is avoided.

The above object is achieved, according to the present invention, in a device of the type generally set forth above in that a barrel-shaped portion which is movable in a pivotal manner is located at the housing edge, the barrel-shaped portion being disposed in a fitting, cage-shaped depression of the housing edge and a flexible cable extending therethrough, and, further, being covered by an angle which is provided with oblong clearance for the cable the clearance extending over the edge of the housing.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
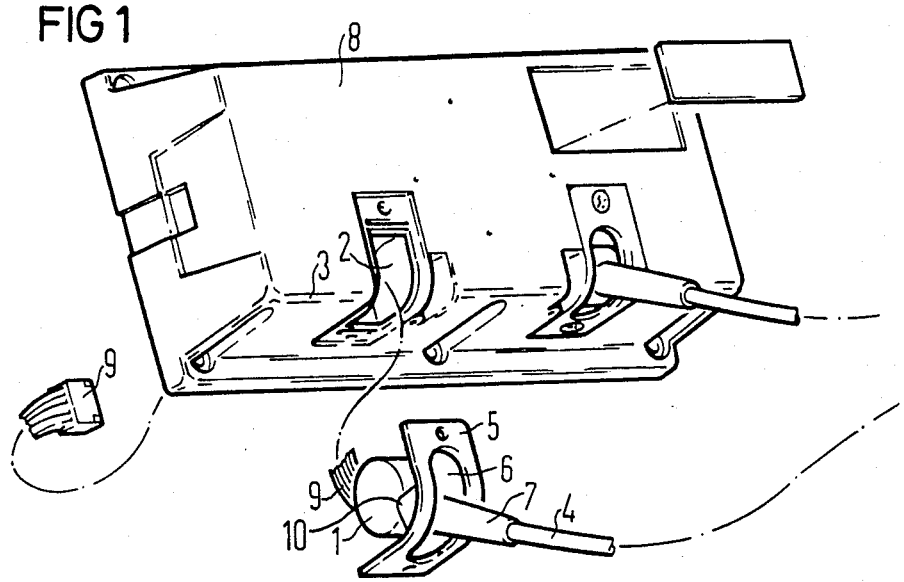
FIG. 1 is a perspective view of the rear side of the housing, together with cable transitions, and shown in an exploded view.

Rear cable transitions which are pivotally seated are located in the housing 8 which, in this case, serves as an operating panel of a radio device in a radio telephone system. The swivel mechanism, as shown, comprises a barrel-shaped portion 1 which receives a flexible cable 4 therethrough. The cable 4 is embraced by a cable bushing 7 extending from the barrel-shaped element toward the outside of the device. Towards the inside of the device, the cable 4 is open for access to individual conductors 9. Of course, the cable can also be conducted through at this location so as to include the jacket.

Figure 2:
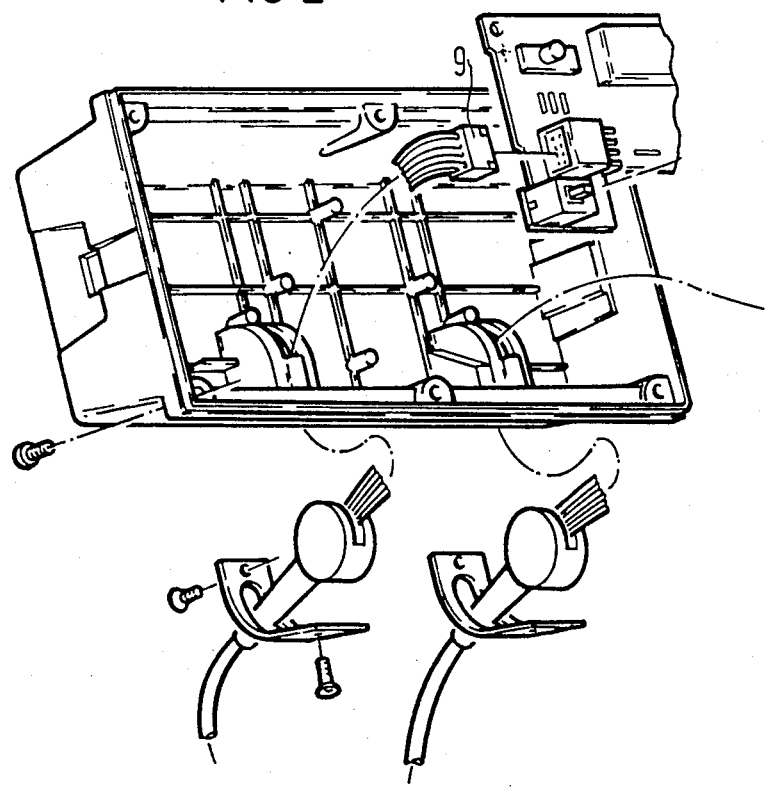
FIG. 2 is a perspective view of the unit of FIG. 1 as seen from the front side of the housing.

The barrel-shaped element is rotatably seated in a suitable cage-shaped depression 2 at one of the housing edges at the rear side of the device. The element is secured against falling out of the housing by way of an angle element 5 which has an oblong hole 6 extending over the housing edge (rear wall and side wall) for passage of the cable. The angle element 5 is preferably screwed to the housing as indicated by the alignable screw holes in FIG. 1 and the screws in FIG. 2. On the outside, the flexible cable 4 can extend to corresponding plugs or socket elements. As indicated in FIG. 2, plug elements 9' can likewise be provided in the interior of the device at the ends of the conductors 9.

Particularly when the cable bushing is constructed as a rigid bushing with the barrel-shaped portion 1, for example as an injected molded part, a cable break is to the great extent avoided even given a repeated change in positioning of the housing such as is frequently required, for example, with such operating units.

The housing can therefore be employed in a free-standing construction or in its built-in condition, or can also be used in a constantly movable condition in the manner of a handset, whereby the angle at which the cable bends off from the housing can change slightly. When, in particular, the cable is to extend away from the housing in a vertical or horizontal direction, snaps for the desired privileged directions can also be provided for the portions 1 and 2 which form the articulation, such as ribs and detents such as at 10.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A cable transition into a housing of a communications device, comprising:
   a housing including first and second adjacent walls disposed at an angle with respect to one another;
   an angular opening extending through said first and second walls;
   a barrel-shaped element having a cable extending therethrough;
   a cage mounted in said housing adjacent said opening for receiving said barrel-shaped element; and
   an angle element including an oblong hole therethrough receiving the cable therethrough, said angle element secured to said housing and closing said opening with said barrel-shaped element mounted in said cage, whereby said cable is provided with a pivotal securement to said housing.

2. The cable transition of claim 1, and further comprising:
   a cable bushing extending from said barrel-shaped element and receiving said cable therethrough and extending through said oblong hole.

3. The cable transition of claim 2, wherein:
   said barrel-shaped element and said cable bushing are a one-piece injection molded part.

4. The cable transition of claim 1, wherein said first and second housing walls converge at a rounded transition.

5. The cable transition of claim 1, wherein:
   the cable comprises a plurality of conductors and has an open end for access to the conductors in the housing.

6. The cable transition of claim 1, wherein:
   said barrel-shaped element and said cage comprise respective ribs and detents for locating the cable at a plurality of positions.

* * * * *